United States Patent [19]
Chaloner-Gill et al.

[11] Patent Number: 5,520,850
[45] Date of Patent: May 28, 1996

[54] ACIDITY REDUCTION OF ADHESION PROMOTER LAYER

[76] Inventors: Benjamin Chaloner-Gill, 520 Mansion Ct., #303, Santa Clara, Calif. 95054; M. Neal Golovin, 8 Wensley Dale Ct., Owings Mills, Md. 21117; Russell Moulton, 6316 Felder Dr., San Jose, Calif. 95123

[21] Appl. No.: 310,789

[22] Filed: Sep. 27, 1994

Related U.S. Application Data

[62] Division of Ser. No. 163,205, Dec. 6, 1993, Pat. No. 5,399,447.

[51] Int. Cl.$^6$ .............................. H01B 1/00; H01M 6/18
[52] U.S. Cl. .................... 252/500; 252/502; 252/512; 429/192
[58] Field of Search .................... 429/191, 192, 429/217; 252/500, 502, 512

[56] References Cited

U.S. PATENT DOCUMENTS

| | | | |
|---|---|---|---|
| 5,262,253 | 11/1993 | Golovin | 429/192 |
| 5,354,631 | 10/1994 | Chaloner-Gill et al. | 429/215 X |
| 5,418,089 | 5/1995 | Chaloner-Gill et al. | 429/191 |
| 5,419,984 | 5/1995 | Chaloner-Gill et al. | 429/192 |

*Primary Examiner*—Anthony Skapars

[57] ABSTRACT

This invention is directed to an adhesion promoter layer promoter layer containing a binder and a conducting material having a reduced acidity, as well as electrolytic cells prepared with such adhesion promoter layers.

15 Claims, No Drawings

ACIDITY REDUCTION OF ADHESION PROMOTER LAYER

This application is a divisional of application Ser. No. 08/163,205, filed Dec. 6, 1993, now U.S. Pat. No. 5,399,447.

BACKGROUND OF THE INVENTION

1. Field of the Invention

This invention is directed to an adhesion promoter layer having a reduced acidity, and, in particular, an adhesion promoting layer containing a binder and a conducting material having a reduced acidity.

This invention is further directed to solid electrolytic cells (batteries) containing an anode, a solid electrolyte, a cathode, and an adhesion promoter layer having a reduced acidity.

2. State of the Art

Electrolytic cells containing an anode, a cathode and a solid, solvent-containing electrolyte incorporating a salt are known in the art and are usually referred to as "solid batteries". These cells offer a number of advantages over electrolytic cells containing a liquid electrolyte (i.e., "liquid batteries") including improved safety features. Notwithstanding their advantages, the manufacture of these solid batteries requires careful process controls to maximize the adherence of the various layers during formation of the electrolytic cells. Poorly adhered laminates can inhibit battery performance and can significantly reduce charge and discharge capacity.

Typically, a cathode is formed on a current collector, such as a metal foil. On particularly smooth foils, the cathode does not adhere well. A solution to this problem includes roughening the surface of the metal foil. Roughening of the foil can be economically disadvantageous and also contributes an undesirable extra processing step. Another solution is to apply an adhesion promoter layer to the current collector. Adhesion promoter layers made of a binder and a conducting medium, e.g., polyacrylic acid and carbon, cause problems relating to reduction of lithium. The acidity of the binder can react with the lithium metal anode in the battery, reducing tile amount of available lithium within the system and decreasing the potential cycle life of the battery. Additionally, the introduction of $H^+$ions into the cathode can occupy potential $Li^+$sites, thus reducing the capacity of the battery.

Typically, solid batteries employ a solid electrolyte interposed between a cathode and an anode. The solid electrolyte contains either an inorganic or an organic matrix and a suitable salt, such as an inorganic ion salt, as a separate component. The inorganic matrix may be non-polymeric, e.g, β alumina, silver oxide, lithium ioctide, and the like, or polymeric, e.g., inorganic (polyphosphazene) polymers, whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, ethylene oxide, propylene oxide, ethyleneimine, epichlorohydrin, ethylene succinate, and an acryloyl-derivatized alkylene oxide containing an acryloyl group of the formula $CH_2=CR'C(O)O-$ where R' is hydrogen or a lower alkyl of from 1–6 carbon atoms.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

The solid electrolytes also contain a solvent (plasticizer) which is typically added to the matrix primarily to enhance the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like.

The solid, solvent-containing electrolyte has typically been formed by one of two methods. In one method, the solid matrix is first formed and then a requisite amount of this material is dissolved in a volatile solvent. Requisite amounts of a salt, and the electrolyte solvent (typically a glyme compound and an organic carbonate) are then added to the solution. This solution is then placed on the surface of a suitable substrate, e.g., the surface of a cathode, and the volatile solvent is removed to provide for the solid electrolyte.

In the other method, a monomer or partial polymer of the polymeric matrix to be formed is combined with appropriate amounts of the salt and the solvent. This mixture is then placed on the surface of a suitable substrate, e.g., the surface of the cathode, and the monomer is polymerized or cured (or the partial polymer is then further polymerized or cured) by conventional techniques (heat, ultraviolet radiation, electron beams, and the like) so as to form the solid, solvent-containing electrolyte.

Typically, cathodes for solid electrolytic cells are prepared by providing a current collector with an adhesion promoter layer made of polyacrylic acid and carbon. A mixture of cathodic material, an electroconductive agent, solid matrix forming monomer, solvent, and viscosifying agent are then coated on the adhesion promoter layer of the current collector substrate followed by curing with e-beam or UV radiation. Alternatively, the solid matrix is first formed and then a requisite amount of this material is dissolved in a volatile solvent. Requisite amounts of cathodic material, an electroconductive agent, solvent, and viscosifying agent are then are then added to the solution. This solution is then placed on the surface of the adhesion promoter layer of the current collector substrate, and the volatile solvent is removed.

When the solid electrolyte is formed on a cathodic surface, an anodic material can then be laminated onto the solid electrolyte to form a solid battery, i.e., an electrolytic cell.

Regardless of which of the above techniques is used in preparing the electrolytic cell, improvements are sought in the adhesion promoter layer. Improvements in the reduction of the acidity of the binder of the adhesion promoter layer are sought to improve the lithium cyclability of the electrolytic cell. Improvements sought in the adhesion promoter layer also include the removal of protons and the introduction of lithium ions into the carbon network, which increases the concentration of lithium. Improvements are sought which reduce the amount of protons, which can occupy intercalation sites resulting in reducing the migration of Li+ions across the electrolyte.

In view of the above, the art is searching for methods to improve adhesion promoter layer manufacture and coatability as well as to increase the adherence of the laminate layers of solid batteries employing such layers.

SUMMARY OF THE INVENTION

The present invention is directed, in part, to the discovery that the treatment of a polyacrylic acid/carbon adhesion promoter layer with a basic lithium compound provides for several benefits to the solid battery manufacturing process as well as to the solid battery itself. In particular, the present invention provides for a polyacrylic acid/carbon adhesion promoter layer treated with a basic lithium compound which provides for the introduction of lithium ions into the carbon network and the removal of protons, which when not removed can upon migration react with lithium metal. The resultant improved adhesion promoter layer also provides for enhanced electrolyte preformance.

By a reduction in tile amount of protons and the introduction of lithium ions into the carbon/binder network an increase in the concentration of lithium ions is achieved. In this manner, an adhesion promoter layer having improved properties is provided.

Further, an electrolytic cell having improved properties is also provided. Decreasing the availability of protons which can adversely react with lithium charge carriers increases electrolyte performance, which improves the performance of the electrolytic cell. Electrolytic cell manufacturing procedures are also improved since the need to roughen tile surface of tile current collector is eliminated.

Moreover, the improved adhesion promoter layer of the present invention improves battery performance. Battery performance is improved by increasing the availability of the lithium charge carriers.

Accordingly, in one of its composition aspects, the present invention is directed to an adhesion promoter layer for an electrolytic cell which comprises a dispersed colloidal solution comprising:

polyacrylic acid;

a conducting material; and a basic lithium compound.

In another of its composition aspects, the present invention is directed to an electrolytic cell which comprises:

an anode containing a compatible anodic material;

a cathode containing a compatible cathodic material and adhered to an adhesion promoter layer comprising polyacrylic acid, a conducting material, and a basic lithium compound; and interposed between said anode and said cathode a solid, solvent-containing electrolyte.

In one of its method aspects, the present invention is directed to a process for preparing a solid adhesion promoter layer for an electrolytic cell which comprises:

(a) providing a dispersed colloidal solution comprising:
      polyacrylic acid,
      a conducting material,
      a solvent;

(b) treating said dispersed colloidal solution with a basic lithium compound; and (c) removing said solvent from said colloidal solution so as to form a solid adhesion promoter layer having a reduced acidity as compared to the dispersed colloidal solution.

DETAILED DESCRIPTION OF THE PREFERRED EMBODIMENTS

As noted above, this invention is directed to an adhesion promoter layer containing a binder and a conducting material having a reduced acidity, and solid electrolytic cells made therefrom. By virtue of the reduced acidity, an increase in the lithium concentration within the electrolytic cell components is achieved, which provides for improved charging properties. Protons are removed which can otherwise occupy intercalation sites in the cathode. The presence of these protons would result in a reduction of the capacity of the battery, since Li+ions would be displaced. Further, the resultant improved adhesion promoter layer also provides for the removal of protons which can adversely react with a lithium metal anode. The neutralization treatment of the adhesion promoter layer of the present invention lowers the acidity of the binder and renders the cell chemistry less reactive towards the lithium metal anode. Moreover, electrolytic cell manufacturing procedures are also improved since the need for toughening the surface of a smooth current collector is eliminated.

However, prior to describing this invention in further detail, the following terms are defined below.

Definitions

As used herein, the following terms have the following meanings.

The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting.

Suitable solid polymeric matrices are well known ill the art and include solid matrices formed from inorganic polymers, organic polymers or a mixture of inorganic and organic polymers. Preferably, tile solid polymeric matrix is all organic matrix derived from a solid matrix forming monmer and from partial polymers of a solid matrix forming monomer.

Alternatively, tile solid polymeric matrix call be used in combination with a non-polymeric inorganic matrix. See, for example, U.S. Pat. No. 4,990,413, which is incorporated herein by reference in its entirety. Suitable non-polymeric inorganic materials for use in conjunction with tile solid polymeric matrix include, by way of example, β-alumina, silver oxide, lithium iodide, and tile like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monmer" refers to inorganic or organic materials which in monomeric form can be polymerized, preferably ill the presence of a salt, and a solvent mixture of an organic carbonate and a glyme compound, to form solid matrices which are suitable for use as solid electrolytes in electrolytic cells. Suitable solid matrix forming monomers are well known in tile art and tile particular monmer employed is not critical. Preferably, tile solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. patent application Ser. No. 07/918,438, filed Jul. 22, 1992, and entitled "SOLID ELECTROLYTES DERIVED BY POLYMERIZATION OF VINYL SULFONATE POLYALKYLENE OXIDES" now U. S. Pat. No. 5,262,253 which application is incorporated herein by reference ill its entirety), and the like as well as mixtures thereof.

Examples of suitable inorganic solid matrix forming monomers include, by way of example, phosphazenes and siloxanes. Phosphazene monomers and tile resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monmer" refers to solid matrix forming monomers which have been partially polymerized to form reactive oligomers. Partial polymerization may be conducted for the purpose of enhancing the viscosity of the monmer, decreasing the volatility of the monmer, and the like. Partial polymerization is generally permitted so long as the resulting partial polymer can be further polymerized, preferably in the presence of a solvent, such as, a mixture of an organic carbonate and a glyme compound, to form solid polymeric matrices which are suitable for use as solid electrolytes in electrolytic cells.

The term "cured" or "cured product" refers to the treatment of the solid matrix forming monmer or partial polymer thereof under polymerization conditions (including cross-linking) so as to form a solid polymeric matrix. Suitable polymerization conditions are well known in the art and include by way of example, heating the monmer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of cured products suitable for use in this invention are set forth in U.S. Pat. Nos. 4,830,939 and 4,990,413 which are incorporated herein by reference in their entirety.

The solid matrix forming monmer or partial polymer can be cured or further cured prior to or after addition of the salt, solvent and viscosifier. For example, a composition comprising requisite amounts of the solid matrix forming monmer, salt, organic carbonate/glyme solvent and viscosifier can be applied to a substrate and then cured. Alternatively, the solid matrix forming monomer can be first cured and then dissolved in a suitable volathe solvent. Requisite amounts of the salt, organic carbonate/glyme solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature. Accordingly, the solid electrolyte of this invention does not include a separator as is typical of liquid electrolytes.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $B(C_6H_5)_4^-$ and the like. Specific examples of suitable inorganic ion salts include $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$ and the like. The inorganic ion salt preferably contains at least one atom selected from the group consisting of Li, Na and K.

The term "organic carbonate" refers to hydrocarbyl carbonate compounds of no more than about 12 carbon atoms and which do not contain any hydroxyl groups. Preferably, the organic carbonate is a linear aliphatic carbonate and most preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl- 1,3-dioxolan-2-one; 4,4-dimethyl-1,3-dioxolan-2-one; 4-methyl-5-ethyl-1,3-dioxolan-2-one; 4,5-diethyl- 1,3-dioxolan-2-one; 4,4-diethyl-1,3-dioxolan-2-one; 1,3-dioxan-2-one; 4,4-dimethyl-1,3-dioxan-2-one; 5,5-dimethy-l-1,3-dioxan-2-one; 5-methyl-1,3-dioxan-2-one; 4-methyl-1.3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an a cyclic aliphatic carbonate for use within the scope of this invention. See, for instance, U.S. Pat. No. 4, 115,206, which is incorporated herein by reference in its entirety.

Likewise, the cyclic aliphatic carbonates useful for this invention may be prepared by transestcrification of a suitable alkane-$\alpha,\beta$-diol or an alkane-$\alpha, \gamma$-diol with, e.g., diethyl carbonate under transesterification conditions. See, for instance, U.S. Pat. Nos. 4,384,115 and 4,423,205 which are incorporated herein by reference in their entirety.

Additional suitable cyclic aliphatic carbonates are disclosed in U.S. Pat. No. 4,747,850 which is also incorporated herein by reference in its enticrity.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like.

The term "electrolytic cell" refers to a composite containing an anode, a cathode and an ion-conducting electrolyte interposed therebetween.

The anode is typically comprise of a compatible anodic material which is any material which functions as an anode in a solid electrolytic cell. Such compatible anodic materials are well known in the art and include, by way of example, lithium, lithium alloys such as alloys of lithium with aluminum, mercury, tin, zinc, and the like, and intercalation based anodes such as carbon, tungsten oxides and the like.

The cathode is typically comprised of a compatible cathodic material, i.e., intercalation compounds, which is any material which functions as a positive pole in a solid electrolytic cell. Such compatible cathodic materials are well known in the art and include, by way of example, manganese oxides, molybdenum oxides, vanadium oxides, sulfides of titanium and niobium, lithiated cobalt oxides, lithiated manganese oxides, chromium oxides, copper oxides, and the like. The particular compatible cathodic material employed is not critical.

In one preferred embodiment, the compatible cathodic material is mixed with an electroconductive material including, by way of example, graphite, powdered carbon, powdered nickel, metal particles, electronically conductive polymers, i.e., characterized by a conjugated network of double bonds like polypyrrole, polyacetylene, polyaniline and polythiophene and the like, and a binder, such as a polymeric binder, to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive material; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 30 weight percent of a solid matrix forming monmer or partial polymer thereof. (All weight percents are based on the total weight of the cathode.)

The cathode paste is typically spread onto a suitable support such as an adhesion promoter layer of a current collector and then cured by conventional methods to provide for a solid positive cathode plate. The cathode (excluding the support) generally has a thickness of about 20 to about 90 microns.

Current collectors are well known in the art, some of which are commercially available. The adhesion promoting layer is disposed between the current collector and the surface of the cathode not facing the electrolyte, but can also be attached to the anode, if necessary. When the adhesion promoter layer of the current collector is attached to the cathode, the cathode is interposed between the electrolyte and the current collector.

The term "adhesion promoter layer" refers to a layer attached to a current collector and containing a binder and a conducting material. The binder is an acid polymer, preferably polyacrylic acid. The conducting material includes materials such as conducting polymers, metal shavings, and the like, preferably carbon. In accordance with the present invention, the acid groups of the polyacrylic acid binder are neutralized by treatment with a basic lithium compound. The basic lithium compound includes compounds such as lithium hydroxide and lithium salts of a weak acid, e.g., lithium carbonate, lithium acetate, lithium propionate, lithium tartrate, lithium benzoate, lithium borate, and the like. Suitable weak acids have an acid dissociation constant of less than about $1\times10^{-5}$.

The acid group of the polyacrylic acid of the adhesion promoter layer binds to the metal toil current collector. Therefore, upon treatment with a basic lithium compound the level of acidity of the adhesion promoter layer is not reduced beyond a level which promotes adequate binding. Typically, the weight percent is on the order of 0.05 to 0.5 equivalence of LiOH per mole of polyacrylic acid, preferably being as high as possible and still maintaining adequate binding properties. For an equivalence of about 0.25, 1 in 4 acid groups will be neutralized by the LiOH, i.e., the $H^+$ of line acid will be replaced with a $Li^+$ The polyacrylic acid/carbon adhesion promoter layer treated with a basic lithium compound provides for the introduction of lithium ions into the carbon network and for the removal of protons, which upon migration can react with lithium metal anode. By the introduction of lithium ions into the carbon network an increase in the concentration of lithium is achieved. Decreasing the availability of protons, which can detrimentally react with lithium charge carriers increases electrolyte performance, which improves the performance of the electrolytic cell. Protons can occupy intercalation sites, which reduce the migration of $Li^+$ across the electrolyte by blocking the Li ion from entering, preventing reaction with the anode. By reducing the amount of protons, the lithium cyclability of the electrolytic cell can be improved. In this manner, the concentration of lithium charge carriers is increased. Electrolytic cell manufacturing procedures are also improved since the need to roughen the surface of the current collector is eliminated. The adhesion promoter layer may have a thickness of from about 1 to about 10 microns.

In still another preferred embodiment, the electrolyte solvent and the cathode solvent are identical.

Methodology

Methods for preparing solid, solvent-containing electrolytes are well known in the art. In one embodiment, however, this invention utilizes a particular solvent (plasticizer) mixture in the preparation of solid electrolytes which solvent mixture provides improvements in electrolyte manufacture and economics.

As noted above, organic carbonates are either commercially available or can be prepared by art recognized methods. For example, the preparation of carbonate compounds can be readily prepared by reaction of an ethylene oxide derivative with ROH under polymerization conditions. See, for example, U.S. Pat. No. 4,695,291 which is incorporated herein by reference in its entirety.

The solid, solvent-containing electrolyte can be preferably prepared by combining, for example, a solid matrix forming monomer with a salt, the solvent mixture of an organic carbonate and a glyme and a viscosifying agent. The resulting composition can then be uniformly coated onto a suitable substrate, e.g., an adhesion promoter layer, aluminum foil, a glass plate (when the electrolyte is to be peeled off and physically moved to an anode or cathode surface), a lithium anode, a cathode, interposed between an anode and a cathode, and the like, by means of a roller, a doctor blade, a bar coater, a silk screen or spinner to obtain a film of this composition or its solution prior to curing. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu m$). More preferably, the solid, solvent-containing electrolyte may have a thickness of from about 20 to about 250 microns, most preferably, about 20 to about 60 microns.

The electrolyte composition typically comprises from about 5 to about 25 weight percent salt, based on the total weight of the electrolyte; preferably, from about 10 to 20 weight percent.

The electrolyte composition typically comprises from about 40 to about 80 weight percent solvent, based on the total weight of the electrolyte; preferably from about 60 to about 80 weight percent; and even more preferably about 70 weight percent.

The solid electrolyte composition typically comprises from about 5 to about 30 weight percent of solid polymeric matrix, based on the total weight of the electrolyte; preferably from about 15 to about 25 weight percent.

The solid electrolyte composition typically comprises from about 1 to about 15 weight percent of a viscosifier, based on the total weight of the electrolyte composition. Preferably, the viscosifier is employed in an amount of from about 1 to about 10 weight percent, and more preferably from about 2 to about 5 weight percent based on the total weight of the electrolyte composition.

The composition can be cured by conventional methods to form a solid film. For example, when the solid matrix forming monomer contains a reactive double bond, suitable curing methods include heating, irradiation with UV radiation, irradiation with electron beams (EB), and the like. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Ciba Geigy, Ardlesy, N.Y.), and the like.

The initiator is generally employed in an amount sufficient to catalyze the polymerization reaction. Preferably, the initiator is employed at up to about 1 weight percent, based on the weight of the solid matrix forming monmer. When curing is by EB treatment, an initiator is not required.

In an alternative embodiment, the solid polymeric matrix, e.g., formed by polymerization of a solid martrix forming monomer, can be dissolved in a suitable volatile solvent and the requisite amounts of, for example, the salt, solvent mixture of an organic carbonate and a glyme, and viscosifier are then added. The mixture can then be applied onto a suitable substrate, e.g., the surface of the cathode opposite to the current collector, an anode, interposed between an anode and a cathode, and the like, in the manner set forth above. The volatile solvent can be removed by conventional techniques and the composition cured, which should provide for a solid electrolyte. Suitable volatile solvents preferably have a boiling point of less than 85° C. and more preferably between about 45° C. and about 85° C. Particularly preferred volatile solvents are aprotic solvents. Examples of suitable volatile solvents include acetonitrile, tetrahydrofuran, and the like. However, acetonitrile is not preferred if it is to contact the anode, specifically, Li metal or Li alloys.

The resulting solid electrolyte should be a homogeneous, single-phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in mono-, di-, tri- and higher functional acrylate monomers as well as in the urethane acrylate prepolymers, are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising a solid matrix forming monomer, a salt, a solvent and a viscosifier. The composition can then be cured to provide for a solid electrolyte on the cathodic surface. The anode, e.g., a lithium foil, can then be laminated to this composite product in such a way that the solid electrolyte is interposed between the lithium foil and the cathodic material.

In a further preferred embodiment, this process can be reversed, so that the surface of an anode is coated with a composition comprising a solid matrix forming monomer, a salt, a solvent and a viscosifier. The composition can then be cured to provide for a solid electrolyte on the anodic surface. The cathode can then be laminated to this composite product in such a way that the solid electrolyte is interposed between the composite anodic material and the cathodic material.

In a further embodiment, the process of forming an electrolytic cell comprises the steps of interposing between the surfaces of a cathode and an anode, a composition comprising a solid matrix forming monomer, a salt, a solvent and a viscosifier. The composition can then be cured to provide for a solid electrolyte interposed between the cathodic and anodic surface.

Methods for preparing solid electrolytes and electrolytic cells are also set forth in U.S. Pat. Nos. 4,830,939 and 4,925,751 which are incorporated herein by reference in their entirety.

Utility

The present invention, in view of the discussion above, achieves the following:

The adhesion promoter layer having reduced acidity described herein prevents depletion of lithium charge carriers in the solid electrolytic cell produced therefrom. The introduction of lithium ions into the carbon network increases the concentration of lithium.

The adhesion promoter layer having reduced acidity described herein also provides for the removal of protons, which if not removed can react upon migration with a lithium metal anode and reduce the amount of charge carrier cycling.

In addition, the adhesion promoter layer having reduced acidity described herein provides for a solid electrolytic cell having improved mechanical properties.

The following prophetic examples are offered illustrate the present invention and should not be construed in any way as limiting its scope.

EXAMPLE 1

A. The Cathode

The cathode may be prepared from a cathodic paste which, in turn, may be prepared from a cathode powder as follows:

i. Cathode Powder

The cathode powder can be prepared by placing $V_6O_{13}$ (prepared by heating ammonium metavanadate ($NH_4^+$ $VO_3^-$) at 450° C. for 16 hours under N2 flow) into a grinding machine (Attritor Model S-1 purchased from Union Process, Akron, Ohio) and ground for 45 minutes. Afterwards, the resulting mixture can be dried at about 260° C for 16 hours under vacuum.

ii. Cathode Paste

A cathode paste may be prepared by combining sufficient cathode powder which should provide for a final product having 45 weight percent $V_6O_{13}$.

Specifically, 248.8 grams of cathode powder ($V_6O_{13}$) and about 26.2 grams of unground carbon (from Chevron Chemical Company, San Ramon, Calif. under the trade name of Shawinigan Black®) can be combined in a glove box (under dry ( <10ppm $H_2O$) argon at ambient temperature and pressure) with about 169.9 grams of a 4:1 w/w mixture of propylene carbonate/triglyme and the resulting composite mixed under dry argon and at ambient temperature and pressure on a double planetary mixer (Ross #2 mixer available from Charles Ross & Sons, Company, Hauppauge, N.Y.) at about 25 rpms until a paste is formed.

About 5 grams of polyethylene oxide (number average molecular weight about 600,000 available as Polyox WSR-205 from Union Carbide Chemicals and Plastics, Danbury, Conn.), about 42.5 grams of polyethylene glycol diacrylate (molecular weight about 500 available as SR-344 from Sartomer Company, Inc., Exton, Pa.) and containing less than about 50 ppm of inhibitor, and about 7.5 grams of ethoxylated trimethylolpropane triacrylate (TMPEOTA) (molecular weight about 425 available as SR-454 from Sartomer Company, Inc., Exton, Pa.) and containing less than about 50 ppm of inhibitor can be added.

The resulting slurry in the mixer can be heated at about 65° C. while mixing for 2 hours at 60 rpms to provide for the cathodic paste which would have the following approximate weight percent of components:

| | |
|---|---|
| $V_6O_{13}$ | 45.00 weight percent |
| Carbon | 10.00 weight percent |
| propylene carbonate | 27.18 weight percent |
| Triglyme | 6.80 weight percent |
| Polyethylene glycol diacrylate | 8.51 weight percent |
| Ethoxylated trimethylolpropane triacrylate[1] | 1.51 weight percent |
| Polyethylene oxide | 1.00 weight percent |

[1]Inhibitor may be removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin, which results in less than 50 ppm of inhibitor in the product.

In an alternative embodiment, the requisite amounts of all of the cathodic materials other than the cathode powder can be combined to form a first mixture and this first mixture is combined with the cathode powder to form a second mixture. This second mixture can be then thoroughly mixed to provide for the cathode paste.

The cathode paste which can be prepared as above can be placed onto an adhesion promoter layer made of polyacrylic acid and carbon which has been treated with lithium carbonate and laminated to a sheet (about 1 mil (N-25 µm) thick by 10 cm wide) of a smooth nickel current collector. A Mylar cover sheet can then be placed over the paste and the paste spread to a thickness of about 75 microns (µm) with a conventional plate and roller system and cured by passing the sheet through an electron beam apparatus (Electrocurtain, Energy Science Inc., Woburn, Mass.) at a voltage of about 175 kV and a current of about 1 mA and at a conveyor belt speed setting of 50 which provides for a conveyor speed of about 3 in/sec. After curing, the Mylar sheet can be removed which should provide for a solid cathode laminated to a lithium carbonate treated adhesion promoter layer of a nickel current collector.

B. Electrolyte

The electrolyte may be prepared by first combining 56.51 grams of propylene carbonate, 14.13 grams of triglyme and 17.56 grams of urethane acrylate (available as Photomer 6140 from Henkel Corporation, Coating and Chemicals Division, Ambler, Pa.). The propylene carbonate/triglyme/urethane acrylate mixture can be dried over molecular sieves (Grade 514, 4A, 8–12 mesh, available from W. R. Grace, Baltimore, Md.) to remove water.

This solution can then be combined with 2.56 grams of polyethylene oxide (weight average molecular weight about 600,000 available as Polyox WSR-205 from Union Carbide Chemicals and Plastics, Danbury, Conn.). The mixture can then be thoroughly mixed with heating until a temperature of about 65° C. is reached and then cooled to ambient temperature for at least a 2 hour period while stirring is maintained.

Once the polyethylene oxide is dispersed and dissolved, 9.24 grams of $LiPF_6$ (available from Hashimoto Chemical Corporation, Osaka, Japan) can be added while stirring.

The resulting 100 gram mixture would contain the following weight percent of components:

| | |
|---|---|
| Propylene carbonate | 56.51 weight percent |
| Triglyme | 14.31 weight percent |
| Urethane acrylate (Photomer 6140) | 17.56 weight percent |
| $LiPF_6$ | 9.24 weight percent |
| Polyethylene oxide | 2.56 weight percent |

Afterwards, the electrolyte mixture can then be coated by a conventional knife blade to a thickness of about 50 µm onto the surface of the cathode sheet prepared as above (on the side opposite that of the current collector) but without the Mylar covering. The electrolyte can then be cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which should contain a solid electrolyte laminated to a solid cathode which, in turn, is laminated to a lithium carbonate treated adhesion promoter layer of a nickel current collector as descibed above.

C. Anode

The anode may comprise a sheet of lithium foil (about 76 µm thick) which is commercially available from FMC Corporation Lithium Division, Bessemer City, N.C.

D. The Solid Battery

A solid battery may be prepared by first preparing a cathodic paste as described above which can be spread onto a lithium base treated adhesion promoter layer of a nickel current collector as described above, and then cured to provide the cathode. An electrolyte composition as described above can then be placed onto the cathode surface and cured to provide for the solid electrolyte. Then, the anode can be laminated onto the solid electrolyte to provide for the solid battery.

EXAMPLE 2

A solid electrolytic cell can be prepared by first preparing a cathodic paste which is spread onto a lithium compound treated adhesion promoter layer of a current collector and cured to provide for the cathode. An electrolyte solution can be placed onto the cathode surface and cured to provide for the solid electrolyte composition. Then, the anode can be laminated onto the solid electrolyte composition to provide for a solid electrolytic cell. The specifics of this construction are as follows:

A. The Current Collector

The current collector is a sheet of aluminum foil having a layer of adhesion promoter attached to the surface of the foil which should contact the cathode so as to form a composite having a sheet of aluminum foil, a cathode and a layer of adhesion promoter interposed therebetween.

Specifically, the adhesion promoter layer can be prepared as a dispersed colloidal solution by one of two methods. The first preparation of this colloidal solution for this example can be as follows:

84.4 weight percent of carbon powder (Shawinigan Black™—available from Chevron Chemical Company, San Ramon, Calif.)

337.6 weight percent of a 25 weight percent solution of polyacrylic acid (a reported average molecular weight of about 90,000, commercially available from Aldrich Chemical Company —contains about 84.4 grams polyacrylic acid and 253.2 grams water) and 578.0 weight percent of isopropanol.

Then add the appropriate amount, as noted below, of lithium hydroxide.

The carbon powder and isopropanol can be combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid can be added to the solution and mixed for approximately 15 minutes, at which point the pH is in a range of about 2.2 to 2.5. Lithium hydroxide is added with stirring until the pH of the solution reaches a minimum of about 3.5, but no greater than 4.0. The resulting mixture can be pumped to the coating head and roll coated with a Meyer rod onto a sheet of aluminum foil (about 9 inches wide and about 0.0005 inches thick). After application, the solution/ foil can be contacted with a Mylar wipe (about 0.002 inches thick by about 2 inches and by about 9 inches wide - the entire width of aluminum foil). The wipe can be flexibly engaged with the foil, i.e., the wipe contacts the foil, to redistribute the solution so as to provide for a substantially uniform coating. Evaporation of the solvents, i.e., water and isopropanol, via a conventional gas-fired oven can provide for an electrically conducting adhesion promoter layer of about 6 microns in thickness or about $3 \times 10^{-4}$ grams per cm$^2$. The aluminum foil can be cut to about 8 inches wide by removing approximately ½ inch from either side by the use of a conventional slitter so as to remove any uneven edges.

In order to further remove the protic solvent from this layer, the foil can be redried. In particular, the foil can be wound up and a copper support can be placed through the roll's cavity. The roll can be hung overnight from the support in a vacuum oven maintained at about 130° C. Afterwards, the roll can be removed. In order to avoid absorption of moisture from the atmosphere, the roll can be preferably stored in a desiccator or other similar anhydrous environment to minimize atmospheric moisture content until the cathode paste is ready for application onto this roll.

The second preparation of this colloidal solution can comprise mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702 —contains about 25 lbs polyacrylic acid and 75 lbs water) and 18.5 lbs of isopropanol. Stirring can be done in a 30 gallon polyethylene drum with a gear-motor mixer, e.g., Lightnin Labmaster Mixer, model XJ-43, available from Cole-Parmer Instruments Co., Niles, Ill., at 720 rpm with two 5 inch diameter A310type propellers mounted on a single shaft. At this point the pH is in a range of about 2.2 to 2.5. Lithium of lithium hydroxide is added with stirring until the pH of the solution reaches a minimum of about 3.5, but no greater than 4.0. This procedure can wet down the carbon and eliminate any further dust problem. The resulting weight of the mixture should be about 143.5 lbs and contain some "lumps."

The mixture can be further mixed with an ink mill which consists of three steel rollers almost in contact with each other, turning at 275, 300, and 325 rpms, respectively. This high shear operation allows particles that are sufficiently small to pass directly through the rollers. Those that do not pass through the rollers can continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) should indicate that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol can be mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Partner Instrument Co., Niles, Ill.). The composition can be gear pumped through a 25 μm cloth filter, e.g., So-Clean Filter Systems, American Felt and Filter Company, Newburgh, N.Y., and Meyer-rod coated as described above.

B. The Cathode

The cathode can be prepared from a cathodic paste which, in turn, can be prepared from a cathode powder as follows:

i. Cathode Powder

The cathode powder can be prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black™). About 100 grams of the resulting mixture can be placed into a grinding machine (Attritor Model S-1 purchased from Union Process, Akron, Ohio) and ground for 30 minutes. Afterwards, the resulting mixture can be dried at about 260° C. for 21 hours.

ii. Cathode Paste

A cathode paste can be prepared by combining sufficient cathode powder which should provide for a final product having 45 weight percent $V_6O_{13}$.

Specifically, 171.6 grams of a 4:1 weight ratio of propylene carbonate:triglyme can be combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton,Pa.) in a double planetary mixer (Ross #2 mixer available from Charles Ross & Sons, Company, Hauppauge, N.Y.).

A propeller mixture can be inserted into the double planetary mixer and the resulting mixture can be stirred at 150 rpms until homogeneous. The resulting solution can be passed through sodiated 4A molecular sieves. The solution can be returned to a double planetary mixer equipped with the propeller mixer and about 5 grams of polyethylene oxide (number average molecular weight about 600,000 available as Polyox WSR-205 from Union Carbide Chemicals and Plastics, Danbury, Conn.) can be added to the solution vortex by a mini-sieve such as a 25 mesh mini-sieve commercially available as Order No. 57333-965 from VWR Scientific, San Francisco, Calif.

The solution can be heated while stirring until the temperature of the solution reaches 65° C. At this point, stirring can be continued until the solution is completely clear. The propeller blade can be removed and the carbon powder prepared as above can be added as well as an additional 28.71 grams of unground carbon (from Chevron Chemical Company, San Ramon, Calif. under the tradename of Shawinigan Black™). The resulting mixture can be mixed at a rate of 7.5 cycles per second for 30 minutes in the double planetary mixer. During this mixing the temperature can slowly increase to a maximum of 73° C. At this point, the mixing can be reduced to 1 cycle per second and the mixture can be slowly cooled to a temperature of from 40° C. to 48° C., e.g., about 45° C. The resulting cathode paste can be maintained at this temperature until just prior to application onto the adhesion promoter layer of the current collector.

The resulting cathode paste can have the following approximate weight percent of components:

| | |
|---|---|
| $V_6O_{13}$ | 45 weight percent |
| Carbon | 10 weight percent |
| 4:1 propylene carbonate/tri-glyme | 34 weight percent |
| polyethylene oxide | 1 weight percent |
| polyethylene glycol diacrylate | 8.5 weight percent |
| ethoxylated trimethylol-propane triacrylate | 1.5 weight percent |

In an alternative embodiment, the requisite amounts of all of the solid components can be added directly to the combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the adhesion promoter layer of the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated should have a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES," now abandoned which application is incorporated herein by reference in its entirety.

The cathode paste noted above can be placed onto the adhesion promoter layer of the current collector described above by extrusion at a temperature of from about 45° C. to about 48° C. A Mylar cover sheet can be placed over the paste and the paste can be spread to a thickness of about 90 microns (μm) with a conventional plate and roller system and can be cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet can be removed to provide for a solid cathode laminated to the aluminum current collector described above.

C. Electrolyte 56 grams of propylene carbonate, 14 grams of triglyme, and 17 grams of urethane acrylate (Photomer 6140, available from Henkel Corp., Coating and Chemical Division, Ambler, Pa.) can be combined at room temperature until homogeneous. The resulting solution can be passed through a column of 4A molecular sieves to remove water and then can be mixed at room temperature until homogeneous.

At this point, 4 grams of polyethylene oxide having a number average molecular weight of about 600,000 available as Polyox WSR-205 from Union Carbide Chemicals and Plastics, Danbury, Conn., can be added to the solution and then dispersed while stirring with a magnetic stirrer over a period of about 120 minutes. After dispersion, the solution can be heated to between 60° C. and 65° C. with stirring until the viscosifying agent dissolves. The solution can be cooled to a temperature of between 45° and 48° C., a thermocouple can be placed at the edge of the vortex created by the magnetic stirrer to monitor solution temperature, and then 9 grams of $LiPF_6$ can be added to the solution over a 120 minute period while thoroughly mixing to ensure a substantially uniform temperature profile throughout the solution. Cooling can be applied as necessary to maintain the temperature of the solution between 45° and 48° C.

In one embodiment, the polyethylene oxide can be added to the solution via a minisieve such as a 25 mesh mini-sieve commercially available as Order No. 57333-965 from VWR Scientific, San Francisco, Calif.

The resulting solution should contain the following:

| Component | Amount | Weight Percent[a] |
|---|---|---|
| Propylene Carbonate | 56 g | 56 |
| Triglyme | 14 g | 14 |
| Urethane Acrylate | 17 g | 17 |
| $LiPF_6$ | 9 g | 9 |
| PEO | 4 g | 4 |
| Total | 100 g | 100 |

[a] = weight percent based on the total weight of the electrolyte solution (100 g)

This solution can be degassed to provide for an electrolyte solution wherein little, if any, of the $LiPF_6$ salt decomposes.

Optionally, solutions which can be produced as above and which contain the prepolymer, the polyethylene oxide, viscosifying agent, the electrolyte solvent and the $LiPF_6$ salt can be filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure can be conducted using the following weight percent of components:

| | |
|---|---|
| Propylene Carbonate | 52 weight percent |
| Triglyme | 13 weight percent |
| Urethane Acrylate[b] | 20 weight percent |
| $LiPF_6$ | 10 weight percent |
| PEO[c] | 5 weight percent |

[b](Photomer 6140, available from Henkel Corp., Coating and Chemical Division, Ambler, PA)
[c]polyethylene oxide having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over 4A molecular sieves (Grade 514, 8–12 Mesh from Schoofs Inc., Moraga, Calif.) and then proceed to step 4.

2. Dry the propylene carbonate and triglyme over 4A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide through a 25 mesh mini-sieve commercially available as Order No. 57333-965 from VWR Scientific, San Francisco, Calif. While stirring at 300 rpm, add the dried and pre-sifted polyethylene oxide slowing to the solution. The polyethylene oxide should be sifted into the center of the vortex formed by the stirring means over a 30 minute period. Addition of the polyethylene oxide should be dispersive and, during addition, the temperature should be maintained at room temperature (<30° C.).

5. After final addition of the polyethylene oxide, stir an additional 30 minutes to ensure that the viscosifying agent is substantially dispersed.

6. Heat the mixture to 68° C. to 75° C. and stir until the viscosifying agent has melted and the solution has become transparent to light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55 ° C.

8. After the final addition of the $LiPF_6$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte should be cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite can be recovered which contains a solid electrolyte laminated to a solid cathode.

D. Anode

The anode can comprise a sheet of lithium foil (about 76 μm thick) which is commercially available from FMC Corporation Lithium Division, Bessemer City, N. C.

E. The Solid Electrolytic Cell

A sheet comprising a solid battery can be prepared by laminating the lithium foil anode to the surface of the electrolyte in the sheet produced in step C above. Lamination can be accomplished by minimal pressure.

What is claimed is:

1. An adhesion promoter layer for an electrolytic cell which comprises a dispersed colloidal solution comprising:
   polyacrylic acid;
   a conducting material; and
   a basic lithium compound
wherein said adhesion promoter has a pH range of from at least 3.5 to 4.0.

2. The adhesion promoter layer of claim 1, wherein the basic lithium compound is lithium hydroxide or lithium carbonate.

3. The adhesion promoter layer of claim 1, wherein the basic lithium compound is a lithium salt of a weak acid having an acid dissociation constant of less than about $1 \times 10^{-5}$.

4. The adhesion promoter layer of claim 1, wherein the basic lithium compound is lithium carbonate, lithium acetate, lithium propionate, lithium tartrate, lithium benzoate or lithium borate.

5. The adhesion promoter layer of claim 1, having from about 0.05 to about 0.5 equivalence of the basic lithium compound per mole of polyacrylic acid, based on the total weight of the adhesion promoter layer.

6. The adhesion promoter layer of claim 1, wherein the conducting material is carbon, a conducting polymer or metal shavings.

7. A solid adhesion promoter layer of claim 1.

8. The solid adhesion promoter layer of claim 7, having a thickness of from about 1 to about 10 microns.

9. An adhesion promoter layer for an electrolytic cell which comprises a dispersed colloidal solution comprising:
   polyacrylic acid;
   a conducting material; and
   a basic lithium compound
wherein the adhesion promoter layer includes from about 0.05 to about 0.5 equivalence of the basic lithium compound per mole of polyacrylic acid, based on the total weight of the adhesion promoter layer.

10. The adhesion promoter layer of claim 9, wherein the basic lithium compound is lithium hydroxide or lithium carbonate.

11. The adhesion promoter layer of claim 9, wherein the basic lithium compound is a lithium salt of a weak acid having an acid dissociation constant of less than about $1 \times 10^{-5}$.

12. The adhesion promoter layer of claim 9, wherein the basic lithium compound is lithium carbonate, lithium acetate, lithium propionate, lithium tartrate, lithium benzoate or lithium borate.

13. The adhesion promoter layer of claim 9, wherein the conducting material is carbon, a conducting polymer or metal shavings.

14. A solid adhesion promoter layer of claim 9.

15. The solid adhesion promoter layer of claim 14, having at thickness of from about 1 to about 10 microns.

* * * * *